(12) United States Patent
Collins

(10) Patent No.: US 11,391,098 B2
(45) Date of Patent: Jul. 19, 2022

(54) DOUBLE-SHOULDERED CONNECTION FOR DRILLING TUBULARS WITH LARGE INSIDE DIAMETER

(71) Applicant: NTS Amega West USA, Inc., Houston, TX (US)

(72) Inventor: Anthony Louis Collins, Houston, TX (US)

(73) Assignee: NTS AMEGA WEST USA, INC., Houston, TX (US)

( * ) Notice: Subject to any disclaimer, the term of this patent is extended or adjusted under 35 U.S.C. 154(b) by 0 days.

(21) Appl. No.: 16/815,330

(22) Filed: Mar. 11, 2020

(65) Prior Publication Data

US 2020/0408047 A1 Dec. 31, 2020

Related U.S. Application Data

(60) Provisional application No. 62/868,561, filed on Jun. 28, 2019.

(51) Int. Cl.
  *E21B 17/042* (2006.01)
  *F16L 15/00* (2006.01)
  *E21B 17/08* (2006.01)

(52) U.S. Cl.
  CPC ........ *E21B 17/0423* (2013.01); *F16L 15/007* (2013.01); *E21B 17/08* (2013.01)

(58) Field of Classification Search
  CPC ..... F16L 15/008; F16L 15/002; F16L 15/007; E21B 17/08; E21B 17/0423
  USPC ....................................................... 285/333
  See application file for complete search history.

(56) References Cited

U.S. PATENT DOCUMENTS

| 2,107,716 | A | * | 2/1938 | Singleton | ................ E21B 17/08 |
| | | | | | 285/148.19 |
| 2,542,679 | A | * | 2/1951 | Kemnitz | ............... E21B 31/107 |
| | | | | | 285/334 |
| 3,203,713 | A | * | 8/1965 | Pangburn | .............. E21B 17/042 |
| | | | | | 285/333 |
| 4,009,893 | A | | 3/1977 | Schatton et al. | |
| 5,048,871 | A | * | 9/1991 | Pfeiffer | ................. E21B 17/043 |
| | | | | | 285/333 |
| 9,638,362 | B2 | | 5/2017 | Marchand | |
| 2006/0006647 | A1 | | 1/2006 | Hashem et al. | |

(Continued)

FOREIGN PATENT DOCUMENTS

| CA | 3010478 A1 | 9/2018 | |
| EP | 2243920 A1 * | 10/2010 | ............ F16L 15/008 |

*Primary Examiner* — David Bochna
(74) *Attorney, Agent, or Firm* — The Webb Law Firm

(57) ABSTRACT

A threaded connection for drilling tubulars includes a tubular box section having a sidewall. The box section has a tapered box portion of an inner surface of the sidewall between a first end and a second end. The tapered box portion has internal threads, a first torque shoulder on a first side of the tapered box portion, and a second shoulder on a second side of the tapered box portion. A threaded collar having internal collar threads is positioned between the second end and the second shoulder. A threaded insert having a tubular body with an inner surface and an outer surface having external insert threads is configured for threadably connecting to the internal collar threads. A direction of the internal threads of the tapered box portion is opposite to a direction of the internal collar threads and the external insert threads.

18 Claims, 5 Drawing Sheets

(56) References Cited

U.S. PATENT DOCUMENTS

| | | |
|---|---|---|
| 2012/0043756 A1 | 2/2012 | Elder et al. |
| 2015/0218893 A1 | 8/2015 | Briscoe et al. |
| 2017/0101830 A1 | 4/2017 | Inose et al. |
| 2017/0130843 A1 | 5/2017 | Singh et al. |
| 2018/0313211 A1 | 11/2018 | Pan et al. |
| 2018/0328119 A1 | 11/2018 | Juarez |

* cited by examiner

DOUBLE-SHOULDERED CONNECTION FOR DRILLING TUBULARS WITH LARGE INSIDE DIAMETER

CROSS-REFERENCE TO RELATED APPLICATION

This application claims priority to U.S. Provisional Application No. 62/868,561, filed on Jun. 28, 2019, the disclosure of which is hereby incorporated by reference in its entirety.

BACKGROUND OF THE DISCLOSURE

Field of the Disclosure

The present disclosure relates generally to double-shouldered connections used for connecting sections of drilling tubulars, and more particularly, to double-shouldered connections for drilling tubulars with large inside diameter.

Description of Related Art

Drilling tubulars are used in a variety of oilfield operations. In some operations, such drilling tubulars include sections of drill pipe that are joined together to form a drill string. Each drill pipe has a pair of drill collars, with one of the drill collars being a box section at one end of the drill pipe and the other drill collar being a pin section at an opposing end of the drill pipe. To make up the drill string, the box section of a first drill pipe is configured to receive the pin section of a second drill pipe. The connection between the box section of one drill pipe and the pin section of another drill pipe is a threaded connection, wherein the box section has internal threads configured to threadably engage external threads of the pin section.

Over the years, a variety of threaded connections have been developed for securing sections of drill pipe. One example of such a threaded connection is a double-shouldered connection. The internal threads of the box section and the external threads of the pin section have a taper configured to allow quick and efficient connection of the two sections of drill pipe. The box section has a pair of shoulder sections on proximal and distal sides of the internal threads. The shoulder sections are configured to engage corresponding faces on proximal and distal sides of the external threads when the box and pin sections are threadably connected together. Contact between the two shoulder sections on the box section and the corresponding faces on the pin section increases the torque capacity of the joint.

While conventional double-shouldered connections are efficient in providing high torque transmission capabilities for drill pipes of small inside diameter (having inside diameter that is less than 40% of the outside diameter) such conventional designs provide significantly lower torque transmission capabilities when used with drill pipes having a large inside diameter (having inside diameter that is more than 40 and up to 65% of the outside diameter). Accordingly, there is a need in the art for improved double-shouldered connection that increases torque transmission capabilities of large diameter drill pipes.

SUMMARY OF THE DISCLOSURE

In accordance with some examples or aspects of the present disclosure, provided is a double-shouldered threaded connection for drilling tubulars with large inside diameter. The threaded connection may include a tubular box section having a sidewall extending between a first end and a second end in a direction along a longitudinal axis. The tubular box section may include a tapered box portion on an inner surface of the sidewall between the first end and the second end, with the tapered box portion having internal threads along at least a portion thereof. The tubular box section may further have a first torque shoulder on a first side of the tapered box portion and a second shoulder on a second side of the tapered box portion. The tubular box section may further have a threaded collar on the inner surface of the sidewall between the second end and the second shoulder, with the threaded collar having internal collar threads. The tubular box section may further have a threaded insert having a tubular body with an inner surface and an outer surface, the threaded insert having external insert threads on the outer surface configured for threadably connecting to the internal collar threads. A direction of the internal threads of the tapered box portion may be opposite to a direction of the internal collar threads and the external insert threads.

In accordance with some examples or aspects of the present disclosure, the internal threads of the tapered box portion may have a right-hand thread direction. The internal collar threads and the external insert threads may have a left-hand thread direction. The second shoulder may be configured to space an end surface of the threaded insert from a terminal surface of a mating pin section. The tapered box portion may taper from the first end toward the second end in a direction toward the longitudinal axis. The tapered box portion, the first torque shoulder, and the second shoulder may be tapered in a same direction relative to the longitudinal axis.

In accordance with some examples or aspects of the present disclosure, the threaded connection may further include a tubular pin section configured for threadably connecting to the tubular box section. The tubular pin section may have an outer surface with a tapered pin portion having external pin threads configured for threadably connecting to the internal threads of the tapered box portion. The tubular box section may be formed on a first drilling tubular and the tubular pin section may be formed on a second drilling tubular removably connectable to the first drilling tubular. The pin section may further have a first torque face on a first side of the tapered pin portion, the first torque face configured for engaging the first torque shoulder of the box section, and a second face on a second side of the tapered pin portion, the second face configured for engaging the second shoulder of the box section. When the first torque face on the pin section is engaged with the first torque shoulder on the box section and the second face on the pin section is engaged with the second shoulder on the box section, a terminal surface of the pin section may be spaced apart from an end surface of the threaded insert.

In accordance with some examples or aspects of the present disclosure, a drilling tubular may have a tubular body having a sidewall extending between a first end and a second end in a direction along a longitudinal axis, a box section at the first end of the tubular body, and a pin section at the second end of the tubular body. The box section may have a tapered box portion having internal threads, a first torque shoulder on a first side of the internal threads and a second shoulder on a second side of the internal threads, and a threaded collar on the inner surface of the sidewall between the second end and the second shoulder. The threaded collar may have internal collar threads. The box section may further have a threaded insert having a tubular insert body with an inner surface and an outer surface, the threaded insert having external insert threads on the outer surface configured for threadably connecting to the internal collar threads. A direction of the internal threads of the tapered box portion may be opposite to a direction of the internal collar threads and the external insert threads.

In accordance with some examples or aspects of the present disclosure, the internal threads of the tapered box portion may have a right-hand thread direction, and the internal collar threads and the external insert threads may have a left-hand thread direction. The second shoulder may be configured to space an end surface of the threaded insert from a terminal surface of a mating pin section. The tapered box portion may taper in a direction toward the longitudinal axis. The tapered box portion, the first torque shoulder, and the second shoulder may be tapered in a same direction relative to the longitudinal axis.

In accordance with some examples or aspects of the present disclosure, the pin section may have an outer surface with a tapered pin portion having external pin threads configured for threadably connecting to corresponding internal threads on a second drilling tubular. The pin section further may have a first torque face on a first side of the tapered pin portion, and a second face on a second side of the tapered pin portion.

In accordance with some examples or aspects of the present disclosure, a threaded connection for drilling tubulars may include a tubular box section having a sidewall extending between a first end and a second end in a direction along a longitudinal axis, and a tubular pin section configured for threadably connecting to the tubular box section. The tubular box section may have a tapered box portion on an inner surface of the sidewall between the first end and the second end. The tapered box portion may have internal threads along at least a portion thereof. The tubular box section may have a threaded collar on the inner surface of the sidewall, the threaded collar having internal collar threads. The tubular box section may have a threaded insert having a tubular body with an inner surface and an outer surface, the threaded insert having external insert threads on the outer surface configured for threadably connecting to the internal collar threads. The tubular pin section may have an outer surface with a tapered pin portion having external pin threads configured for threadably connecting to the internal threads of the tapered box portion. A direction of the internal threads of the tapered box portion may be opposite to a direction of the internal collar threads and the external insert threads.

In accordance with some examples or aspects of the present disclosure, the tubular box section further may have a first torque shoulder on a first side of the tapered box portion and a second shoulder on a second side of the tapered box portion. The pin section further may have a first torque face on a first side of the tapered pin portion and a second face on a second side of the tapered pin portion. The first torque face may be configured for engaging the first torque shoulder of the box section and the second face may be configured for engaging the second shoulder of the box section. When the first torque face on the pin section is engaged with the first torque shoulder on the box section and the second face on the pin section is engaged with the second shoulder on the box section, a terminal surface of the pin section may be spaced apart from an end surface of the threaded insert. The tubular box section may be formed on a first drilling tubular and the tubular pin section may be formed on a second drilling tubular removably connectable to the first drilling tubular.

In accordance with some examples or aspects of the present disclosure, the double-shouldered connection can be further characterized by one or more of the following numbered clauses.

Clause 1. A threaded connection for drilling tubulars, the threaded connection comprising: a tubular box section having a sidewall extending between a first end and a second end in a direction along a longitudinal axis; a tapered box portion on an inner surface of the sidewall between the first end and the second end, the tapered box portion having internal threads along at least a portion thereof; a first torque shoulder on a first side of the tapered box portion and a second shoulder on a second side of the tapered box portion; a threaded collar on the inner surface of the sidewall between the second end and the second shoulder, the threaded collar having internal collar threads; and a threaded insert having a tubular body with an inner surface and an outer surface, the threaded insert having external insert threads on the outer surface configured for threadably connecting to the internal collar threads, wherein a direction of the internal threads of the tapered box portion is opposite to a direction of the internal collar threads and the external insert threads.

Clause 2. The threaded connection according to clause 1, wherein the internal threads of the tapered box portion have a right-hand thread direction, and wherein the internal collar threads and the external insert threads have a left-hand thread direction.

Clause 3. The threaded connection according to clause 1 or 2, wherein the second shoulder is configured to space an end surface of the threaded insert from a terminal surface of a mating pin section Clause 4. The threaded connection according to any of clauses 1-3, wherein the tapered box portion tapers from the first end toward the second end in a direction toward the longitudinal axis.

Clause 5. The threaded connection according to any of clauses 1-4, wherein the tapered box portion, the first torque shoulder, and the second shoulder are tapered in a same direction relative to the longitudinal axis.

Clause 6. The threaded connection according to any of clauses 1-5, further comprising a tubular pin section configured for threadably connecting to the tubular box section, the tubular pin section comprising an outer surface with a tapered pin portion having external pin threads configured for threadably connecting to the internal threads of the tapered box portion.

Clause 7. The threaded connection according to clause 6, wherein the tubular box section is formed on a first drilling tubular and wherein the tubular pin section is formed on a second drilling tubular removably connectable to the first drilling tubular.

Clause 8. The threaded connection according to clause 6 or 7, wherein the pin section further comprises a first torque face on a first side of the tapered pin portion, the first torque face configured for engaging the first torque shoulder of the box section, and a second face on a second side of the tapered pin portion, the second face configured for engaging the second shoulder of the box section.

Clause 9. The threaded connection according to clause 8, wherein, when the first torque face on the pin section is engaged with the first torque shoulder on the box section and the second face on the pin section is engaged with the second shoulder on the box section, a terminal surface of the pin section is spaced apart from an end surface of the threaded insert.

Clause 10. A drilling tubular comprising: a tubular body having a sidewall extending between a first end and a second end in a direction along a longitudinal axis; a box section at the first end of the tubular body; and a pin section at the second end of the tubular body, wherein the box section comprises: a tapered box portion having internal threads, a first torque shoulder on a first side of the internal threads and a second shoulder on a second side of the internal threads; a threaded collar on the inner surface of the sidewall between the second end and the second shoulder, the threaded collar having internal collar threads; and a threaded insert having a tubular insert body with an inner surface and an outer surface, the threaded insert having external insert threads on the outer surface configured for threadably connecting to the internal collar threads, and wherein a direction of the internal threads of the tapered box portion is opposite to a direction of the internal collar threads and the external insert threads.

Clause 11. The drilling tubular according to clause 10, wherein the internal threads of the tapered box portion have a right-hand thread direction, and wherein the internal collar threads and the external insert threads have a left-hand thread direction.

Clause 12. The drilling tubular according to clause 10 or 11, wherein the second shoulder is configured to space an end surface of the threaded insert from a terminal surface of a mating pin section.

Clause 13. The drilling tubular according to any of clauses 10-12, wherein the tapered box portion tapers in a direction toward the longitudinal axis.

Clause 14. The drilling tubular according to any of clauses 10-13, wherein the tapered box portion, the first torque shoulder, and the second shoulder are tapered in a same direction relative to the longitudinal axis.

Clause 15. The drilling tubular according to any of clauses 10-14, wherein the pin section comprises an outer surface with a tapered pin portion having external pin threads configured for threadably connecting to corresponding internal threads on a second drilling tubular.

Clause 16. The drilling tubular according to clause 15, wherein the pin section further comprises a first torque face on a first side of the tapered pin portion, and a second face on a second side of the tapered pin portion.

Clause 17. A threaded connection for drilling tubulars, the threaded connection comprising: a tubular box section having a sidewall extending between a first end and a second end in a direction along a longitudinal axis; and a tubular pin section configured for threadably connecting to the tubular box section, wherein the tubular box section comprises: a tapered box portion on an inner surface of the sidewall between the first end and the second end, the tapered box portion having internal threads along at least a portion thereof; a threaded collar on the inner surface of the sidewall, the threaded collar having internal collar threads; and a threaded insert having a tubular body with an inner surface and an outer surface, the threaded insert having external insert threads on the outer surface configured for threadably connecting to the internal collar threads, wherein the tubular pin section comprises an outer surface with a tapered pin portion having external pin threads configured for threadably connecting to the internal threads of the tapered box portion, and wherein a direction of the internal threads of the tapered box portion is opposite to a direction of the internal collar threads and the external insert threads.

Clause 18. The threaded connection according to clause 17, wherein the tubular box section further comprises a first torque shoulder on a first side of the tapered box portion and a second shoulder on a second side of the tapered box portion, wherein the pin section further comprises a first torque face on a first side of the tapered pin portion and a second face on a second side of the tapered pin portion, and wherein the first torque face is configured for engaging the first torque shoulder of the box section and the second face is configured for engaging the second shoulder of the box section.

Clause 19. The threaded connection according to clause 18, wherein, when the first torque face on the pin section is engaged with the first torque shoulder on the box section and the second face on the pin section is engaged with the second shoulder on the box section, a terminal surface of the pin section is spaced apart from an end surface of the threaded insert.

Clause 20. The threaded connection according to any of clauses 17-19, wherein the tubular box section is formed on a first drilling tubular and wherein the tubular pin section is formed on a second drilling tubular removably connectable to the first drilling tubular.

The features that characterize the present disclosure are pointed out with particularity in the claims, which are annexed to and form a part of this disclosure. These and other features of the disclosure, its operating advantages, and the specific objects obtained by its use will be more fully understood from the following detailed description in which non-limiting examples of the disclosure are illustrated and described.

BRIEF DESCRIPTION OF THE DRAWINGS

In FIGS. 1-5, like characters refer to the same components and elements, as the case may be, unless otherwise stated.

DETAILED DESCRIPTION OF THE DISCLOSURE

Figure 1:
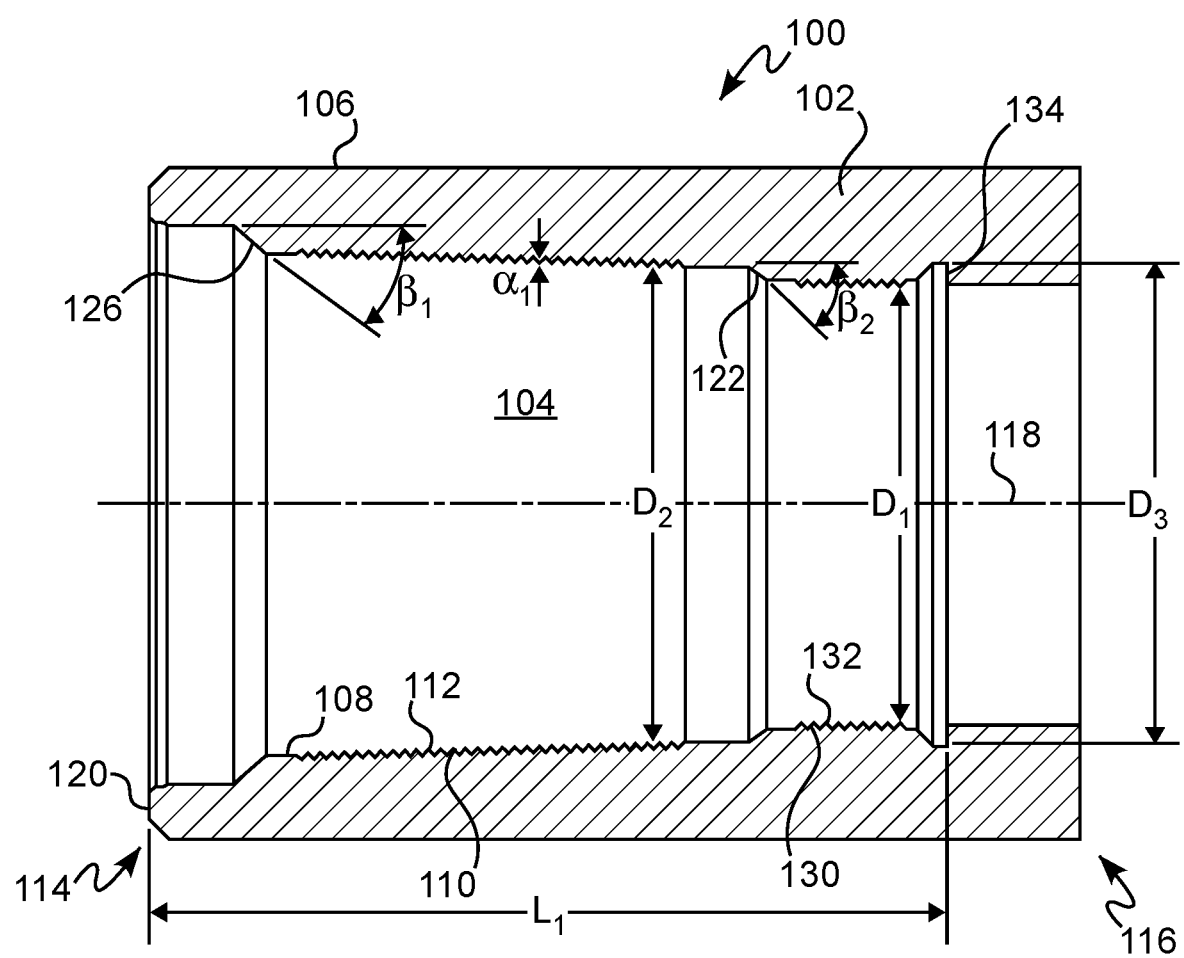
FIG. 1 is a longitudinal cross-section view of a box section of a threaded connection in accordance with some examples or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "large inside diameter", when used with reference to an inner or inside diameter of a drilling tubular, refers to an inside diameter that is 40-65% of an outside or outer diameter of the drilling tubular.

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

With reference to FIG. 1, a box section 100 of one end of a drilling tubular 101 is shown in accordance with some examples or aspects of the present disclosure. In some non-limiting examples or aspects, the drilling tubular 101 may be a drilling pipe, a drilling collar, drilling sub, or other drilling tool. The box section 100 is configured for threadably connecting to a pin section 200 (shown in FIG. 2) of another drilling tubular. Together, the box section 100 and the pin section 200 constitute a threaded connection. The drilling tubular 101 having the box section 100 shown in FIG. 1 has a corresponding pin section, such as the pin section 200 shown in FIG. 2, at an end that is opposite to the end where the box section 100 is provided.

With continued reference to FIG. 1, the box section 100 has a tubular shape with a sidewall 102 extending in a longitudinal direction of the drilling tubular 101 along a longitudinal axis 118. The sidewall 102 extends circumferentially about the axis 118 and defines an interior 104. The sidewall 102 has an outer surface 106 and an inner surface 108. In some examples or aspects, the outer surface 106 may be smooth and substantially circular in shape. The outer surface 106 may have a uniform diameter along a longitudinal length of the drilling tubular 101. The inner surface 108 may have one or more features configured for threadably connecting the box section 100 to a corresponding pin section of another drilling tubular 101, such as another drilling tubular 101 having the pin section shown in FIG. 2.

With continued reference to FIG. 1, the inner surface 108 of the box section 100 has a tapered portion 110. The tapered portion 110 tapers in a direction from a first end 114 of the box section 100 toward a second end 116 in a direction toward the longitudinal axis 118. The first end 114 may be one of the terminal ends of the drilling tubular 101. A first end 126 of the tapered section 110 may have a chamfered edge configured to assist with centering a corresponding pin section of another drilling tubular 101 during thread engagement. The first end 126 of the tapered section 110 may be tapered at an angle $\beta_1$ in a direction toward the longitudinal axis 118. Angle $\beta_1$ may be about 30° to about 60°. A second end 122 of the tapered section 110 also may have a chamfered edge that is configured to assist with centering the corresponding pin section. The second end 122 of the tapered section 110 may be tapered at an angle $\beta_2$ in a direction toward the longitudinal axis 118. Angle $\beta_2$ may be about 30° to about 60°. In some examples or aspects, the second end 122 of the tapered section 110 may have an edge that is substantially perpendicular to the longitudinal axis 118 and is configured for providing a shoulder for engaging the corresponding pin section, as described herein.

At least a portion of the tapered portion 110 may have internal threads 112 along the surface of the tapered portion 110. A taper $\alpha_1$ of the tapered portion 110 is selected to allow for quick and efficient aligning of the internal threads 112 of the box section 100 with external threads of the pin section 200 during engagement of the box section 100 with the pin section 200. In some non-limiting embodiments or aspects, the taper $\alpha_1$ may be about ¾ in/ft to about 3 in/ft. The internal threads 112 of the tapered portion 110 may have a right-hand thread direction. The internal threads 112 may have a desired thread depth and thread pitch based on a particular application of the drilling tubular 101.

With continued reference to FIG. 1, the inner surface 108 of the box section 100 has a first torque shoulder 120 at the first end 114 and a second shoulder 134. In this manner, the tapered portion 110 is disposed between the first torque shoulder 120 and the second shoulder 134. The first torque shoulder 120 is substantially perpendicular to the longitudinal axis 118 and is configured to engage a first torque face on the pin section 200, as described herein. Similarly, the second shoulder 134 is substantially perpendicular to the longitudinal axis 118 and is configured to engage a second face on the pin section 200. The first torque shoulder 120 and the second shoulder 134 are separated by a distance $L_1$ in a direction along the longitudinal axis 118. In some examples or aspects, an additional second shoulder may be defined by the second end 122 of the tapered section 110. The additional second shoulder may be substantially perpendicular to the longitudinal axis 118 or angled at an angle $\beta_2$.

With continued reference to FIG. 1, the inner surface 108 of the box section 100 has a threaded collar 130 positioned between second shoulders 122 and 134. In some examples or aspects, an inner diameter $D_1$ of the box section 100 at the threaded collar 130 may be smaller than an inner diameter $D_2$ of the box section 100 between the first end 114 and the threaded collar 130. The inner diameter $D_1$ at the threaded collar 130 may be smaller than an inner diameter of a portion of the box section 100 between the threaded collar 130 and the second end 116. The threaded collar 130 may have the second shoulder 134 protruding radially into the inner surface 108 of the box section 108. The inner diameter $D_1$ at the threaded collar 130 may be smaller than an inner diameter of the second shoulder 134. At least a portion of the threaded collar 130 has internal threads 132 configured for threadably engaging threads on a threaded insert, as described herein. In some examples or aspects, the internal threads 132 of the threaded collar 130 may have a left-hand thread direction. The internal threads 132 of the threaded collar 130 may have a desired thread depth and thread pitch based on a particular application of the drilling tubular 101.

Figure 2:
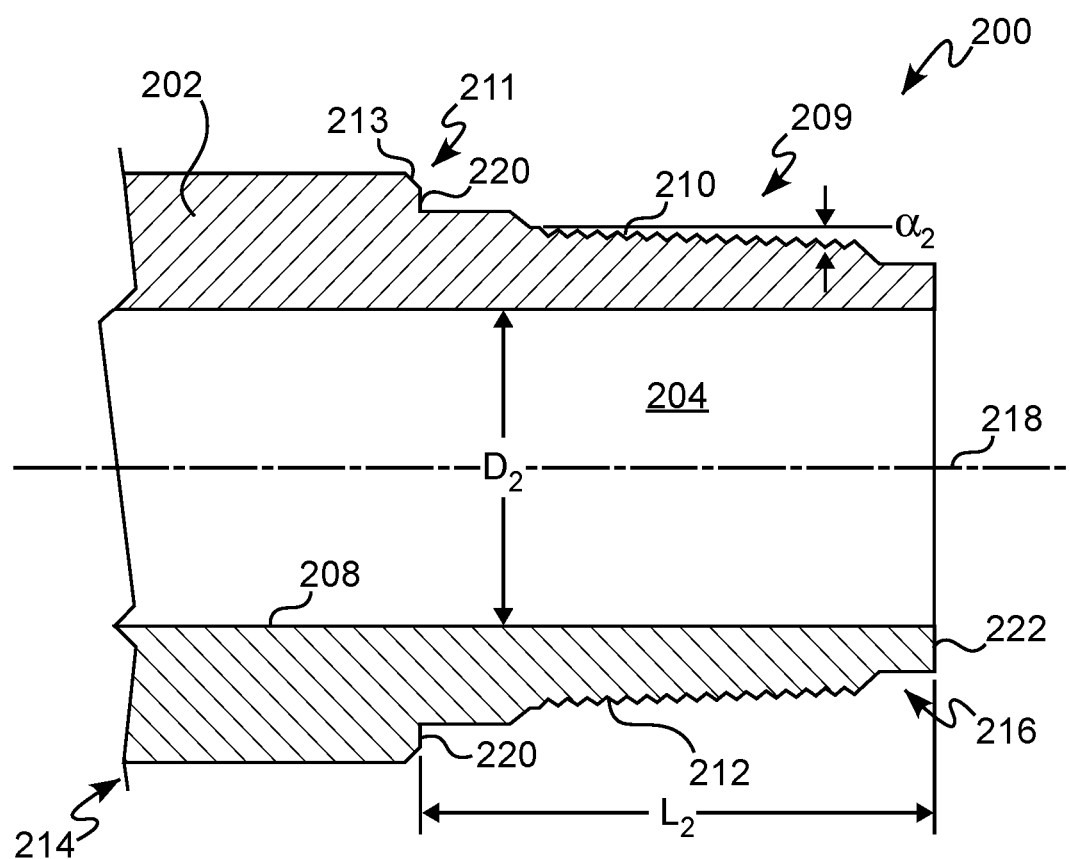
FIG. 2 is a longitudinal cross-section view of a pin section of a threaded connection configured for connecting with the box section shown in FIG. 1.

With reference to FIG. 2, the pin section 200 is shown in accordance with some examples or aspects of the present disclosure. As noted herein, the pin section 200 is configured for threadably connecting with the box section 100. The pin section 200 may be provided on an end of a drilling tubular 101 that is opposite of the end at which the box section 100 is provided. For example, in some examples or aspects, the box section 100 (shown in FIG. 1) may be provided at a first or right-hand side of the drilling tubular 100, while the pin section 200 may be provided on a second or left-hand side of the drilling tubular.

With continued reference to FIG. 2, the pin section 200 has a tubular shape with a sidewall 202 extending in a longitudinal direction of the drilling tubular 101 along the longitudinal axis 218. The sidewall 202 extends circumferentially about the axis 218 and defines an interior 204. The sidewall 202 of the pin section 200 has an outer surface 206 and an inner surface 208. In some examples or aspects, the inner surface 208 may be smooth and substantially circular in shape. The inner surface 208 may have a uniform diameter D4 along a longitudinal length of the drilling tubular 101. The outer surface 206 may have one or more features configured for threadably connecting the pin section 200 to a corresponding box section of another drilling tubular 101, such as another drilling tubular 101 having the box section shown in FIG. 1.

With continued reference to FIG. 2, the outer surface 206 is stepped down at a nose 209 of the pin section 200 and has a tapered portion 210 having external threads 212. A step 211 reduces an outer diameter of the pin section 200 at the nose 209. The step 211 may have a chamfered edge 213. The tapered portion 210 of the pin section 200 tapers in a direction from a first end 214 of the pin section 200 toward a second end 216 in a direction toward a longitudinal axis 218. The second end 216 may be one of the terminal ends of the drilling tubular 101 that is opposite to the end where the box section 100 is provided. A taper $\alpha_2$ of the tapered portion 210 is selected to correspond to taper $\alpha_1$ of the tapered portion 110 of the box section 100 (shown in FIG. 1). The external threads 212 of the tapered portion 210 may have a right-hand thread direction that corresponds to the right-hand thread direction of the internal threads 112 on the box section 100. The external threads 212 of the tapered portion 210 may have a desired thread depth and thread pitch that corresponds to the thread depth and thread pitch of the internal threads 112 of the box section 100.

With continued reference to FIG. 2, the outer surface 206 of the pin section 200 has a first torque face 220 at the step 211 and a second face 222 at the second end 216 of the pin section 200. In this manner, the tapered portion 210 is disposed between the first torque face 220 and the second faces 222. The first torque face 220 is substantially perpendicular to the longitudinal axis 218 and is configured to engage the first torque shoulder 120 on the box section 100 (shown in FIG. 1) when the pin section 200 is fully connected to the box section 100, as described herein. Similarly, the second face 222 is substantially perpendicular to the longitudinal axis 218 and is configured to engage the second shoulder 122 on the box section 100 (shown in FIG. 1) when the pin section 200 is fully connected to the box section 100, as described herein. The first torque face 220 and the second face 222 are separated by a distance $L_2$ in a direction along the longitudinal axis 118. Distance $L_2$ corresponds to distance $L_1$ (shown in FIG. 1) between the first torque shoulder 120 and second shoulder 134. A position of the second shoulder 122 is configured to manage a gap between an outer surface of an insert and the second face 222, as described herein.

Figure 3A:
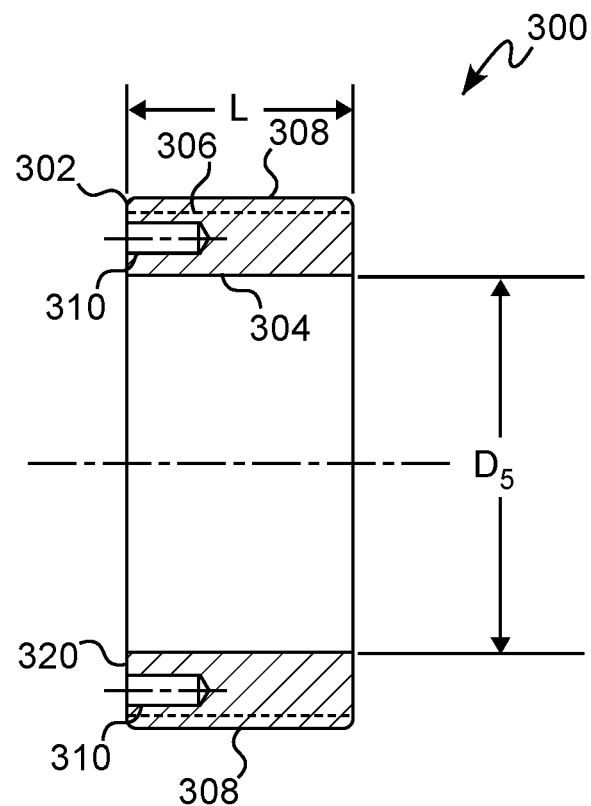
FIG. 3A is a longitudinal cross-section view of a threaded insert for use with the box section shown in FIG. 1.
Figure 3B:
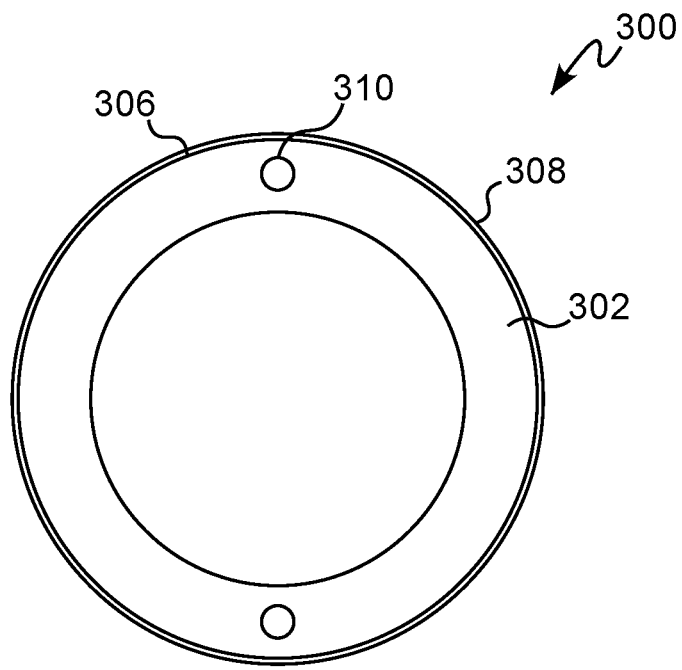
FIG. 3B is a front view of the threaded insert shown in FIG. 3A.

With reference to FIGS. 3A-3B, a threaded insert 300 is shown in accordance with some non-limiting examples or aspects of the present disclosure. The threaded insert 300 has a tubular body 302 extending in a direction of a longitudinal axis 303. The tubular body 302 has an inner surface 304 facing the longitudinal axis 303 and an outer surface 306 opposite the inner surface 304. An inner diameter $D_5$ of the inner surface 304 may be substantially uniform along a longitudinal length L of the threaded insert 300 in a direction along the longitudinal axis 303. At least a portion of the outer surface 306 of the threaded insert 300 may have external threads 308 that are configured to threadably engage with internal threads 132 of the threaded collar 130 of the box section 100 (shown in FIG. 1). In some examples or aspects, the external threads 308 of the threaded insert 300 have a left-hand thread direction that corresponds to the left-hand thread direction of the internal threads 132 of the threaded collar 130 of the box section 100.

With continued reference to FIGS. 3A-3B, the body 302 of the threaded insert 300 further has at least one connection element, such as a bore 310, configured to receive a tool for assisting in installation and removal of the threaded insert 300 in the threaded collar 130 of the box section 100. The bore 310 extends through at least a portion of the body 302 in a direction substantially parallel to the longitudinal axis 303 and is approximately the same as diameter $D_2$ of the mating pin section (shown in FIG. 2). In some examples or aspects, a pair of bores 310 may be provided opposite each other, with each of the bores being configured for receiving a tool for installing and removing the threaded insert 300 in the threaded collar 130. The pair of bores 310 may be positioned diametrically opposite to each other.

Figure 4A:
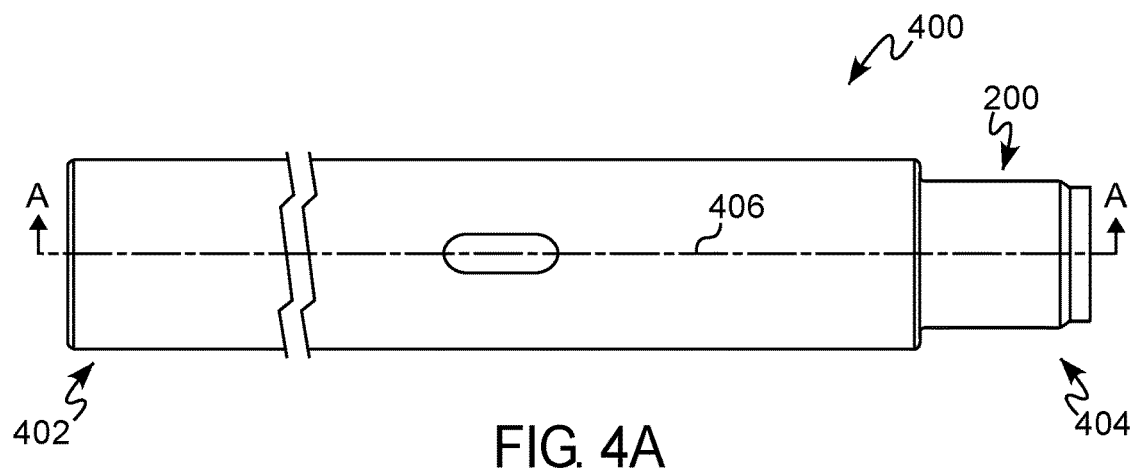
FIG. 4A is a longitudinal side view of a drilling tubular in accordance with some examples or aspects of the present disclosure.
Figure 4B:
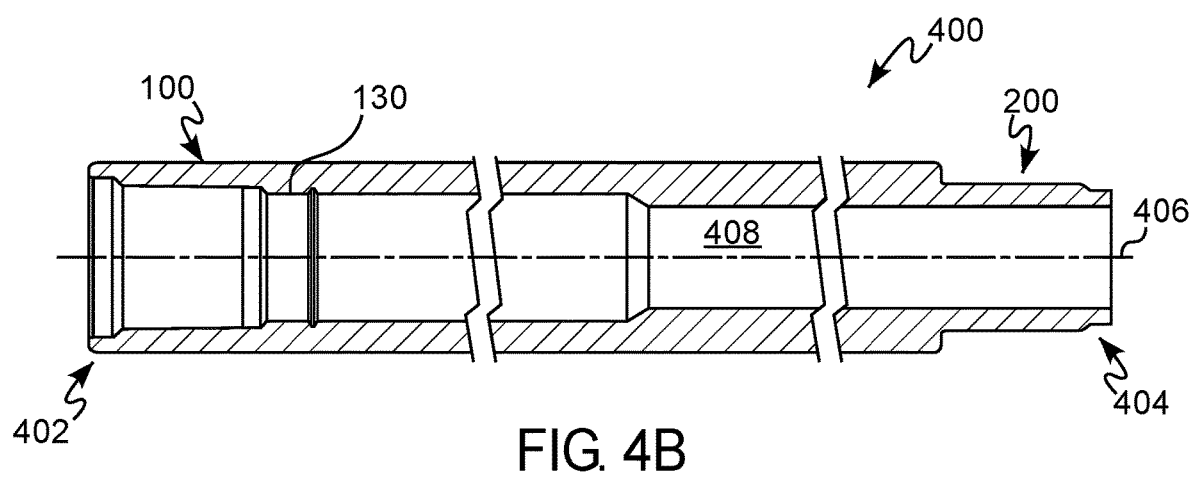
FIG. 4B is a longitudinal cross-section view of the drilling sub shown in FIG. 4A taken along line A-A.
Figure 4C:
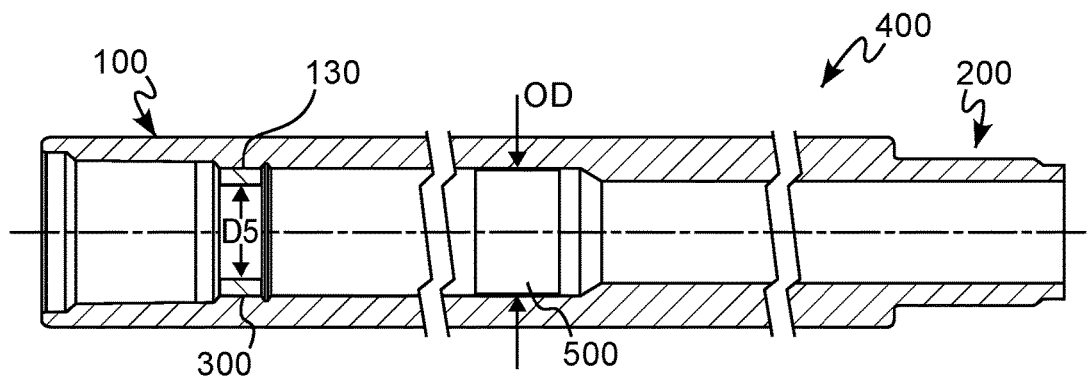
FIG. 4C is a longitudinal cross-section view of the drilling sub shown in FIG. 4B along with the threaded insert and a drilling tool within an interior of the drilling sub.

With reference to FIGS. 4A-4C, a drilling tubular, such as a drilling sub 400, is shown in accordance with some non-limiting examples or aspects of the present disclosure. The drilling sub 400 may be shaped like the drilling tubular 101 described herein with reference to FIGS. 1-2 and may further include one or more additional components or tools for performing drilling operations. The drilling sub 400 has a first end 402 spaced apart from a second end 404 along a longitudinal axis 406. As shown in FIG. 4B, the first end 402 has the box section 100, while the second end 404 has the pin section 200. The box section 100 and the pin section 200 may be identical to the box section 100 and the pin section 200 described herein with reference to FIGS. 1-2, respectively. With reference to FIG. 4C, the threaded collar 130 of the box section 100 has the threaded insert 300 described herein with reference to FIGS. 3A-3B.

The drilling sub 400 has a hollow interior 408 configured for receiving one or more tools, as described herein. The interior 408 is configured to receive at least one tool 500 (shown in FIG. 4C) useful in drilling operations. For example, the tool 500 may be a filter assembly, a rotor of a mud motor, a measurement tool used in logging-while-drilling (LWD) or measuring-while-drilling (MWD) operations, or a rotary steerable tool. In further examples, the tool 500 may be a drilling jar, or a universal bottom hole orientation (UBHO) sub used in MWD operations. Such tools 500 typically have an outer diameter that is too large to fit within the standard 2.5 inch bore of conventional drill pipes having a double-shoulder connection. Accordingly, the drilling sub 400 has a portion with an increased inner diameter that is configured to receive the tool 500. An outer diameter OD of the tool 500 may be smaller than an inner diameter $D_6$ of the interior 408 of the drilling sub 400. The outer diameter OD may be larger than an inner diameter $D_5$ of the threaded insert 300. Accordingly, the tool 500 may be placed within the interior 408 of the drilling sub 400 from the first end 402 and prior to installing the threaded insert 300.

Figure 5:
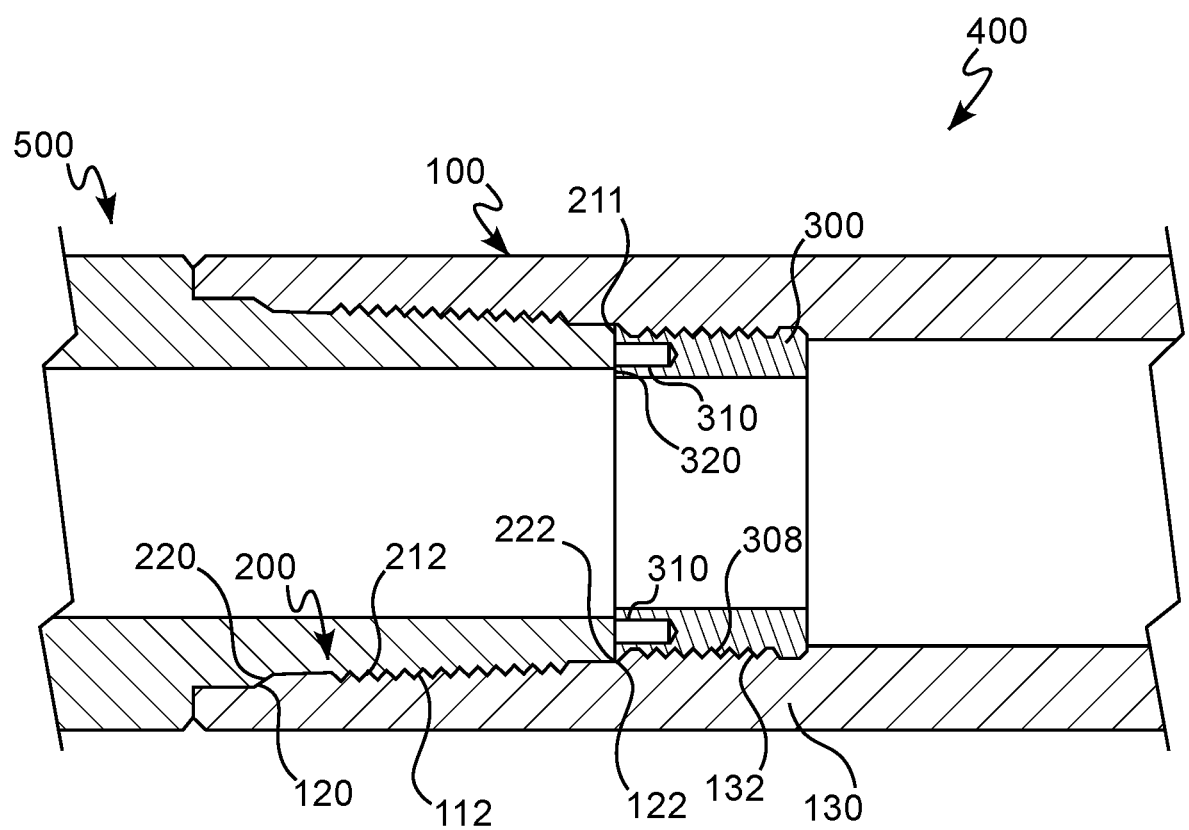
FIG. 5 is a longitudinal cross-section view of a box section of the drilling sub shown in FIG. 4C with a pin section of a second drill pipe connected to the box section.

With reference to FIG. 5, the drilling sub 400 is shown connected to another drilling tubular, such as a drill pipe 500. In particular, the box section 100 at the first end 402 of the drilling sub 400 is shown in threaded connection with a pin section 200 of the drill pipe 500. As shown in FIG. 5, the external threads 212 on the pin section 200 of the drill pipe 500 are threadably engaged with the internal threads 112 on the box section 100 of the drilling sub 400. Furthermore, the first torque face 220 on the pin section 200 of the drill pipe 500 is engaged with the first torque shoulder 120 on the box section 100 of the drilling sub 400, and the second face 222 is engaged with the second shoulder 122 on the box section 100. In addition, a terminal surface 126 of the pin section 200 is spaced apart from an end surface 320 of the threaded insert 300 in the box section 100 of the drilling sub 400 by a predetermined gap. In some examples or aspects, the predetermined gap may be 0 to 0.15 in. As the second face 222 engages with the second shoulder 122, the opposite thread of the threaded insert 300 will tighten. In this manner, further engagement between second face 222 and the second shoulder 122 continuously tightens the interface between the threaded insert 300 and the box section 100, while avoiding loading on the small internal shoulder.

It will be readily appreciated by those skilled in the art that various modifications, as indicated above, may be made to the disclosure without departing from the concepts disclosed in the foregoing description. Accordingly, the particular examples or aspects described in detail herein are illustrative only and are not limiting to the scope of the disclosure, which is to be given the full breadth of the appended claims and any and all equivalents thereof.

What is claimed is:

1. A threaded connection for drilling tubulars, the threaded connection comprising:
   a tubular box section having a sidewall extending between a first end and a second end in a direction along a longitudinal axis;
   a tapered box portion on an inner surface of the sidewall between the first end and the second end, the tapered box portion having internal threads along at least a portion thereof;
   a first torque shoulder on a first side of the tapered box portion and a second shoulder on a second side of the tapered box portion;
   a threaded collar on the inner surface of the sidewall between an end of the tapered box portion and the second shoulder, the threaded collar having internal collar threads; and
   a threaded insert having a tubular body with an inner surface and an outer surface, the threaded insert having external insert threads on the outer surface configured for threadably connecting to the internal collar threads,
   wherein a direction of the internal threads of the tapered box portion is opposite to a direction of the internal collar threads and the external insert threads.

2. The threaded connection according to claim 1, wherein the internal threads of the tapered box portion have a right-hand thread direction, and wherein the internal collar threads and the external insert threads have a left-hand thread direction.

3. The threaded connection according to claim 1, wherein the second shoulder is configured to space an end surface of the threaded insert from a terminal surface of a mating pin section.

4. The threaded connection according to claim 1, wherein the tapered box portion tapers from the first end toward the second end in a direction toward the longitudinal axis.

5. The threaded connection according to claim 1, wherein the tapered box portion, the first torque shoulder, and the second shoulder are tapered in a same direction relative to the longitudinal axis.

6. The threaded connection according to claim 1, further comprising a tubular pin section configured for threadably connecting to the tubular box section, the tubular pin section comprising an outer surface with a tapered pin portion having external pin threads configured for threadably connecting to the internal threads of the tapered box portion.

7. The threaded connection according to claim 6, wherein the tubular box section is formed on a first drilling tubular and wherein the tubular pin section is formed on a second drilling tubular removably connectable to the first drilling tubular.

8. The threaded connection according to claim 6, wherein the pin section further comprises a first torque face on a first side of the tapered pin portion, the first torque face configured for engaging the first torque shoulder of the box section, and a second face on a second side of the tapered pin portion, the second face configured for engaging the second shoulder of the box section.

9. The threaded connection according to claim 8, wherein, when the first torque face on the pin section is engaged with the first torque shoulder on the box section and the second face on the pin section is engaged with the second shoulder on the box section, a terminal surface of the pin section is spaced apart from an end surface of the threaded insert.

10. A drilling tubular comprising:
    a tubular body having a sidewall extending between a first end and a second end in a direction along a longitudinal axis;
    a box section at the first end of the tubular body; and
    a pin section at the second end of the tubular body,
    wherein the box section comprises:
    a tapered box portion having internal threads, a first torque shoulder on a first side of the internal threads and a second shoulder on a second side of the internal threads;

a threaded collar on the inner surface of the sidewall between an end of the tapered box portion and the second shoulder, the threaded collar having internal collar threads; and a threaded insert having a tubular insert body with an inner surface and an outer surface, the threaded insert having external insert threads on the outer surface configured for threadably connecting to the internal collar threads, and wherein a direction of the internal threads of the tapered box portion is opposite to a direction of the internal collar threads and the external insert threads.

11. The drilling tubular according to claim 10, wherein the internal threads of the tapered box portion have a right-hand thread direction, and wherein the internal collar threads and the external insert threads have a left-hand thread direction.

12. The drilling tubular according to claim 10, wherein the second shoulder is configured to space an end surface of the threaded insert from a terminal surface of a mating pin section.

13. The drilling tubular according to claim 10, wherein the tapered box portion tapers in a direction toward the longitudinal axis.

14. The drilling tubular according to claim 10, wherein the tapered box portion, the first torque shoulder, and the second shoulder are tapered in a same direction relative to the longitudinal axis.

15. The drilling tubular according to claim 10, wherein the pin section comprises an outer surface with a tapered pin portion having external pin threads configured for threadably connecting to corresponding internal threads on a second drilling tubular.

16. The drilling tubular according to claim 15, wherein the pin section further comprises a first torque face on a first side of the tapered pin portion, and a second face on a second side of the tapered pin portion.

17. A threaded connection for drilling tubulars, the threaded connection comprising:

a tubular box section having a sidewall extending between a first end and a second end in a direction along a longitudinal axis; and a tubular pin section configured for threadably connecting to the tubular box section, the tubular pin section comprising a first torque face on a first side of the tapered pin section and a second face on a second side of the tapered pin section;

wherein the tubular box section comprises:

a tapered box portion on an inner surface of the sidewall between the first end and the second end, the tapered box portion having internal threads along at least a portion thereof;

a first torque shoulder on a first side of the tapered box portion and a second shoulder on a second side of the tapered box portion;

a threaded collar on the inner surface of the sidewall at an end of the tapered box portion, the threaded collar having internal collar threads; and a threaded insert having a tubular body with an inner surface and an outer surface, the threaded insert having external insert threads on the outer surface configured for threadably connecting to the internal collar threads, wherein the first torque face is configured for engaging the first torque shoulder of the box section and the second face is configured for engaging the second shoulder of the box section, wherein, when the first torque face on the pin section is engaged with the first torque shoulder on the box section and the second face on the pin section is engaged with the second shoulder on the box section, a terminal surface of the pin section is spaced apart from an end surface of the threaded insert, wherein the tubular pin section comprises an outer surface with a tapered pin portion having external pin threads configured for threadably connecting to the internal threads of the tapered box portion, and wherein a direction of the internal threads of the tapered box portion is opposite to a direction of the internal collar threads and the external insert threads.

18. The threaded connection according to claim 17, wherein the tubular box section is formed on a first drilling tubular and wherein the tubular pin section is formed on a second drilling tubular removably connectable to the first drilling tubular.

* * * * *